United States Patent [19]

Shibazaki et al.

[11] Patent Number: 4,794,419
[45] Date of Patent: Dec. 27, 1988

[54] INTEGRAL DOCUMENT PROCESSING APPARATUS EQUIPPED WITH AN IMAGE FORMING SYSTEM AND A FACSIMILE TRANSMISSION SYSTEM

[75] Inventors: Kenji Shibazaki, Aichi; Yoshihisa Kawai, Toyokawa; Kanji Wada, Aichi, all of Japan

[73] Assignee: Minolta Camera Kabushiki Kaisha, Osaka, Japan

[21] Appl. No.: 136,278

[22] Filed: Dec. 22, 1987

[30] Foreign Application Priority Data

Dec. 24, 1986 [JP] Japan ................... 61-312746

[51] Int. Cl.⁴ .......................................... G03G 15/00
[52] U.S. Cl. .............................. 355/3 R; 355/3 SH; 358/300
[58] Field of Search ............. 355/3 R, 3 SH; 358/285, 358/300; 346/153.1, 160; 101/DIG. 13

[56] References Cited

U.S. PATENT DOCUMENTS 4,660,957 4/1987 Ueda et al. .................. 355/3 SH

FOREIGN PATENT DOCUMENTS

56-164668 6/1981 Japan .
60-12859 3/1985 Japan .

Primary Examiner—R. L. Moses
Attorney, Agent, or Firm—Burns, Doane, Swecker & Mathis

[57] ABSTRACT

An integral document processing apparatus comprising an electrophotographic copying system and a facsimile transmission system. A document fed from a common document storing unit is guided selectively to a first document read unit included in the electrophotographic copying system or to a second document read unit included in the facsimile transmission system by a document feed passage changeover mechanism which is operated selectively by an operator. A document delivered to the first document read unit is copied by the electrophotographic copying system. A document delivered to the second document read unit is converted into a corresponding electric image signal, and then the electric image signal is applied to a communications line.

7 Claims, 10 Drawing Sheets

INTEGRAL DOCUMENT PROCESSING APPARATUS EQUIPPED WITH AN IMAGE FORMING SYSTEM AND A FACSIMILE TRANSMISSION SYSTEM

BACKGROUND OF THE INVENTION

The present invention relates to an integral document processing apparatus equipped with an image forming system and a facsimile transmission system and, more specifically, to an integral document processing apparatus equipped with an electrophotographic copying machine incorporating a facsimile transmission unit and having a document feeding unit which serves both as a document feeding unit for the copying machine and the facsimile transmission unit.

In a minor business firm or a small store, only one facsimile equipment is sufficient for transmitting and receiving message. However, in a large enterprise having many offices distributed on many floors in a building, one facsimile equipment is insufficient and hence such a large enterprise needs a plurality of facsimile equipments. It is expected that the use of facsimile equipments at different places in the same building will become more prevalent. When a plurality of facsimile equipments are used in an office building, telephone lines respectively corresponding to the facsimile equipments in number need to be installed in the office building. Recently, private branch telephone exchange system (hereinafter abbreviated to "PBX") have been introduced increasingly into enterprises. However, when a facsimile equipment is connected to PBX, the facsimile equipment is able to transmit message, but the same is unable to receive message, and hence a telephone line exclusively for the facsimile equipment needs to be installed.

On the other hand, distributive installation of electrophotographic copying machines in offices has been prevalent in recent years. Accordingly, the integration of a copying unit, a facsimile transmission unit and a common operating system will facilitate work for facsimile transmission and copying operation and will enable effective use of the copying unit and the facsimile unit.

Although an integral document processing apparatus having an electrophotographic copying unit and a facsimile unit has been known, no integral document processing apparatus having a copying unit and a facsimile transmission unit has been known. Japanese Laid Open Patent Publication No. 60-128859 discloses a copying machine capable of producing a plurality of copies from received facsimile message and collating the copies in accordance with codes included in the facsimile message. However, this known copying machine is not capable of facsimile transmission.

There is also a known document processing apparatus integrally having a digital copying unit which generates digital electric image signals through the pootoelectric conversion of the image of a document and copies the image of the document by driving a thermal printer or a laser beam printer by the electric image signal, and a facsimile unit. However, the copying unit of this known document processing apparatus reads the image of a document electrically, and hence is unable to compete with an electrophotographic copying machine in performance, for example, in resolution of image.

SUMMARY OF THE INVENTION

Accordingly, it is a principal object of the present invention to provide an integral document processing apparatus comprising an image forming system and a facsimile transmission system.

It is another object of the present invention to provide an integral document processing apparatus comprising an image forming system, a facsimile transmission system, and a document feeding system capable of selectively feeding a document from a common document storing means to the image forming system or to the facsimile transmission system.

Foregoing and other objects of the present invention is achieved by an integral document processing apparatus comprising an image forming system and a facsimile transmission system, which comprises a document storing means for storing a plurality of documents; a first document read unit; a second document read unit; a document feed means capable of feeding the documents stored in the document storing means one at a time; a first document conveying means for conveying the document fed by the document feed means to the first document read unit; a second document conveying means for conveying the document fed by the document feed means to the second document read unit; a document passage changeover means for selectively guiding the document to the first document conveying means or to the second document conveying means; an image forming means capable of reading the document delivered to the first document read unit and forming the image of the document on a copying sheet; and a facsimile transmission means capable of reading the document delivered to the second document read unit and providing an electric signal representing the image of the document.

BRIEF DESCRIPTION OF THE DRAWINGS

FIGS. 5 (a), 5 (b), 5 (c) and 5 (d) are flow charts showing the control routines to be executed by a first central processing unit (hereinafter referred to as "first CPU") included in the controller of FIG. 4;

FIGS. 6 (a), 6 (b) and 6 (c) are flow charts showing the control routines to be executed by a second central processing unit (hereinafter referred to as "second CPU") included in the controller of FIG. 4;

DETAILED DESCRIPTION OF THE PREFERRED EMBODIMENTS

A document processing apparatus, in a preferred embodiment, according to the present invention will be described hereinafter with reference to the accompanying drawings.

Figure 1:
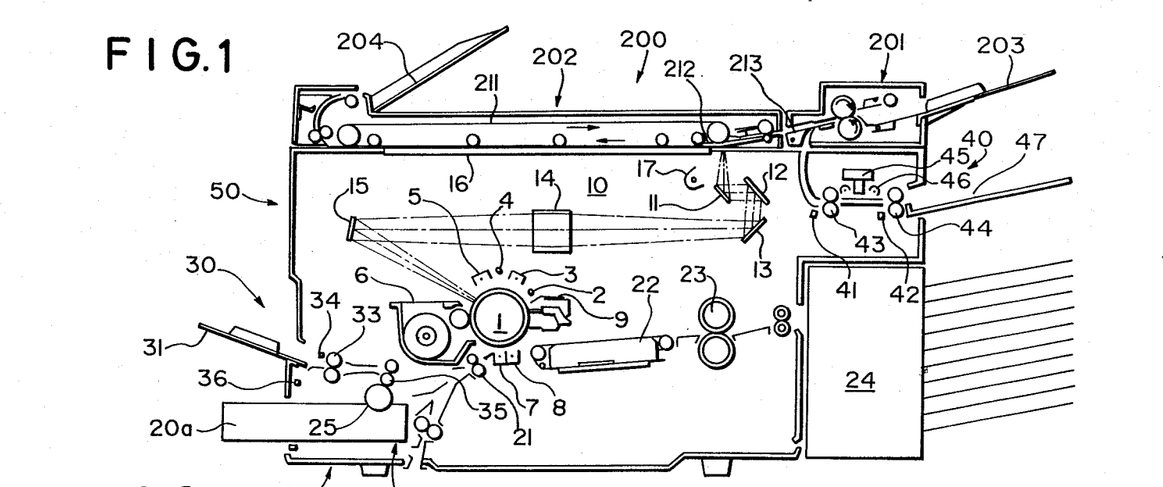
FIG. 1 is a sectional view of an integral document processing apparatus, in a preferred embodiment, according to the present invention capable of image forming operation and facsimile transmission.

Referring to FIG. 1 showing a document processing apparatus 50 capable of electrophotographic copying functions and facsimile transmission functions. The document processing apparatus 50 has an analog electrophotographic copying system which includes photosensitive drum 1 rotatably supported for counterclockwise rotation in the substantially central section of the document processing apparatus 50, and a sequential arrangement of a main eraser lamp 2, a subcharger 3, a suberaser lamp 4, a main charger 5, a developing device 6, a transfer charger 7 a separating charger 8 and a cleaning device 9 arranged around the photosensitive drum 1. The circumference of the photosensitive drum 1 is coated with a photosensitive layer. Electric charges remaining over the circumference of the photosensitive drum 1 is erased and the photosensitive drum 1 is charged and sensitized by the main eraser lamp 2, the suberaser lamp 4, the subcharger 3 and the main charger 5 as the same rotates. The circumference of the photosensitive drum 1 is exposed to a light image provided by an optical scanning system 10 to form an electrostatic latent image thereon.

The optical scanning system 10 is disposed for scanning a document below a contact glass 16. The optical scanning system 10 comprises a light source 17, movable mirrors 11, 12 and 13, a lens 14 and a mirror 15. The light source 17 and the movable mirror 11 are driven for movement to the left as viewed in FIG. 1 for scanning operation at a fixed speed v/n, and the movable mirrors 12 and 13 are driven for movement to the left at a speed v/2n, where v is the fixed circumferential speed of the photosensitive drum 1 and n is a copying magnification.

A copying sheet fed by either an automatic copying sheet feed device 20 disposed at the left end, as viewed in FIG. 1, of the document processing apparatus 50 or a manual copying sheet feed device 30 disposed also at the left end of the document processing apparatus 50 is stopped temporarily by a timing roller 21, and then the copying sheet is fed to a transfer section in synchronism with the rotation of the photosensitive drum 1 so that a toner image formed on the circumference of the photosensitive drum 1 is transferred to the copying sheet at an appropriate position. The toner image is transferred from the photosensitive drum 1 to the copying sheet by the transfer charger 7. Then, the copying sheet is separated from the circumference of the photosensitive drum 1 by the separating charger 8, conveyed by a conveyor belt 22 to the fixing device 23 to fix the toner image to the copying sheet, and then is delivered to a sorter 24.

After the toner image has been transferred from the photosensitive drum 1 to the copying sheet, toner and electric charge remaining on the circumference of the photosensitive drum 1 are eliminated by the cleaning device 9 and the main eraser lamp 2 to prepare the photosensitive drum 1 for the next copying cycle.

In feeding copying sheets, either the automatic sheet feed device 20 or the manual copying sheet feed device 30 is used selectively. When a manual-feed tbble serving also as a guide for guiding a manually-fed copying sheet is positioned at an operative position, a manual-feed table open-close detector 36 provides a signal to activate an arrangement for copying operation by manual copying sheet feeding mode.

In an automatic copying sheet feeding mode, upon the start of a copying operation by operating a start key 113 (FIG. 3) for starting copying operation, an electrophotographic image forming unit including the photosensitive drum 1, and the optical scanning system 10 are actuated and a feed roller 25 is actuated by a copying sheet feed signal provided in relation to the scanning operatio of the optical scanning system 10 to feed a copying sheet in synchronism with the image forming operation of the image forming system.

In the manual copying sheet feeding mode, upon the detection of the manual insertion of a copying sheet by a sensor 34, a feed roller 33 for feeding a copying sheet is rotated to feed te copying sheet for copying operation. At the same time with or with a slight delay after the detection of the copying sheet by the sensor 34, the photosensitive drum 1 and the optical system 10 are started. Then, the copying sheet is stopped temporarily by a conveyor roller 35. When the copying sheet feed signal is issured, the conveyor roller 35 is actuated to feed the copying sheet to the image forming unit.

The facsimile transmission system has a facsimile transmission unit 40 disposed in an upper right-hand portion of the document processing apparatus 50. A document to be transmitted is fed by the document feed unit 201 of an automatic document feeder (hereinafter abbreviated to "ADF") 200. A document feed passage changeover finger 213 is operated so as to feed the document to an image read unit 45 in the facsimile transmission system. The document is conveyed by conveyor rollers 43 and 44. Then the document is illuminated by an illuminating unit 46 and is read by the image read unit 45 consisted of an array of photodiodes such as CCD. The operation of the conveyor rollers 43 and 44 is controlled in relation to the functions of document detectors 41 and 42. After the image of the document has been read by the image read unit 45, the document is delivered to a document discharge tray 47.

A single illuminating lamp may be used for both the facsimile transmission system and the electrophotographic copying system to reduce the cost of the document processing apparatus.

Figure 2:
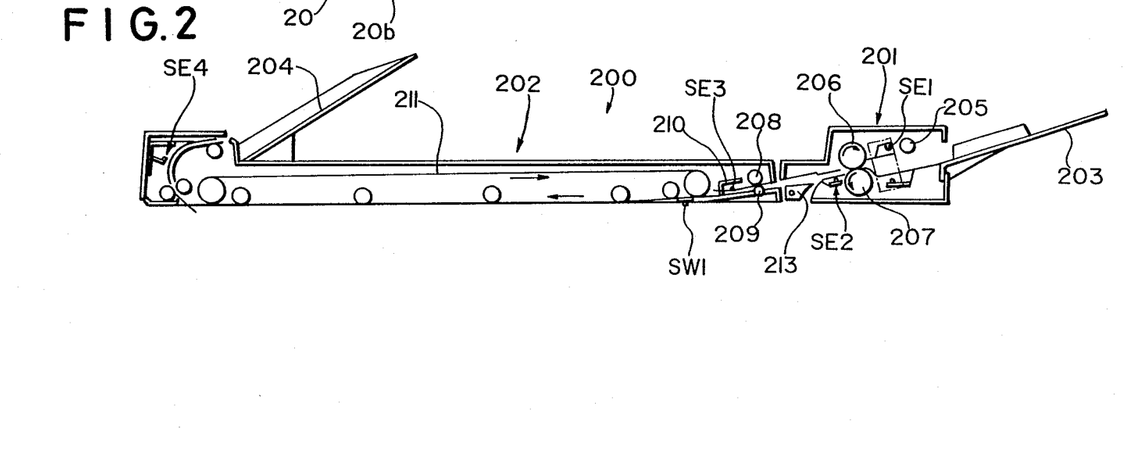
FIG. 2 is a sectional view of a document feeder employed in the integral document processing apparatus of FIG. 1.

The ADF is mounted detachably on the frame of the document processing apparatus 50. As shown in FIG. 2, the ADF 200 comprises the document feed unit (hereinafter referred to "unit A") 201 for storing a plurality of documents and feeding the documents one at a time, and a document conveying unit (hereinafter referred to as "DF unit") 202 for conveying a document along the contact glass, positioning the document at a predetermined position on the contact glass and discharging the document to a document discharge tray 204. The document feed passage changeover finger 213 of the unit A connects the document feed passage selectively to the DF unit 202 or to the facsimile transmission unit 40. The DF unit 202 is able to operate independently for conveying a manually-fed document. Te DF unit 202 is mounted on the upper surface of the document processing apparatus 50 so as to be moved to expose the contact glass 16.

When the electrical connection of the ADF 200 to the document processing apparatus 50 and the correct installation of the same at a predetermined position on the document processing apparatus 50 are detected, the ADF 200 is controlled in relation with the document processing apparatus 50 and the operating mode of the document processing apparatus 50 becomes an automatic document feed mode (hereinafter referred to as "ADF mode"). In the ADF mode, the document processing apparatus 50 is held in a waiting state and the ADF 200 is started, when the start key 113 on the operating panel 101 is operated. Then, a document among those stored on a document feed tray 203 is fed to the facsimile transmission unit 40 or to the DF unit 202 depending on the position of the document feed passage changeover finger 213. Upon the arrival of the document at a predetermined position, the ADF 200 gives a start signal to the document processing apparatus 50, and then the document processing apparatus starts facsimile transmission operation or copying operation. Upon the completion of document scanning operation, the document processing apparatus 50 provides an ADF actuating signal to actuate the ADF 200 for discharging the document to the document discharge tray 47 or 204. If any document to be processed remains on the document feed tray 203, the document is conveyed to the predetermined position simultaneously with the discharge of the preceding document to the document discharge tray 47 or 203.

The manner of operation of the ADF 200 in the ADF mode will be described more specifically hereinafter. When the storage of a document or documents on the document feed tray 203 is detected by a first document detector SE1, the ADF 200 becomes operative. The first document detector SE1 comprises, in combination, for example, a light emitting element and a light receiving element disposed on the opposite sides of the document feed tray 203, respectively. When no document is stored on the document feed tray 203, the light receiving element is able to receive light emitted by the light emitting element.

When a documentor documents are placed on the document feed tray 203 and thereby a start signal is provided, a document feed roller 205 is driven for rotation and is lowered to be pressed against the top document, and thereby the top document is delivered from the document feed tray 203. If a plurality of documents are delivered from the document feed tray 203 by the document feed roller 205, only the top document is advanced further by a feed roller 206 rotating in the normal direction while the rest of the documents are checked by a separating roller 207 rotating in the reverse direction. Upon the detection of the document fed by the feed roller 206 by a second document detector SE2, the document feed roller 205 is raised to be separated from the document.

When the document feed passage changeover finger 213 is positioned so as to deliver the document to the DF unit 202 to copy the the document, the document is delivered to and is advanced further by a pair of feed rollers 208 and 209 of the DF unit 202. Upon the detection of the document fed by the pair of feed rollers 208 and 209 by a third document detector SE3, a pair of pinch rollers 208 and 209 are pressed against each other, the feed roller 206 and the separating roller 207 are stopped, and a conveyor belt 211 is started. Then, with a slight delay after the start of the conveyor belt 211, the pair of pinch rollers 208 and 209 are driven for rotation and a gate 210 is opened to allow the further advancement of the document. Then, the conveyor belt 211 conveys the document along the upper surface of the contact glass 16. A fixed time determined by a timer after the passage of the leading edge of the document by the third document detector SE3, the conveyor belt 211 is stopped, and then the conveyor belt 211 is reversed to bring the trailing edge of the document into abutment with a stopper 212. Thus, the document feed operation is completed.

When the document is stopped in place on the contact glass 16, the ADF 200 gives a signal to the document processing apparatus 50 to start the document processing apparatus 50 for copying operation and, at the same time, the next document is delivered to the gate 210 if any document or documents are stored in the unit A. Upon the completion of the scanning operation of the optical scanning system 10, the document processing apparatus 50 provides a signal to restart the conveyor belt 211 of the ADF 200. Then, the document placed on the contact glas 16 is discharged and, with a predetermined delay determined by a timer after the restart of the conveyor belt 211, the pair of pinch rollers 208 and 209 are pressed against each other to repeat the same document feeding operation. When the document processing apparatus 50 is in a multi copy mode, the document discharging operation is not started until the scanning operation of the optical scanning system 10 for the last copying cycle is completed.

Figure 3:
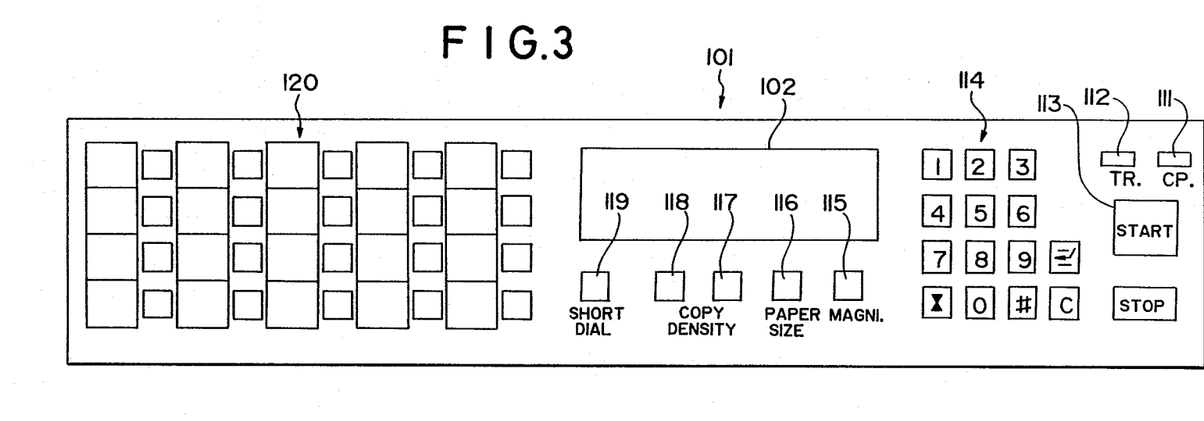
FIG. 3 is a plan view of a control panel incorporated into the integral document processing apparatus of FIG. 1.

Referring to FIG. 3, arranged on the operating panel 101 of the document processing apparatus 50 are operating keys, namely, a copy mode selection key 111, a transmission mode selection key 112, the copy/transmission start key 113, a telephone number/copy number setting key 114, copying magnification setting key 115, a copying sheet size selection key 116, a copy density up key 117, a copy density down key 118 and a short dial code specifying key 119, a liquid crystal display 102 for displaying modes and conditions specified by pperating keys, and a short dial code indicating section 120 provided in the left section as viewed in FIG. 3. Facsimile transmission may be started simply by pressing the transmission mode selection key 112.

Figure 4:
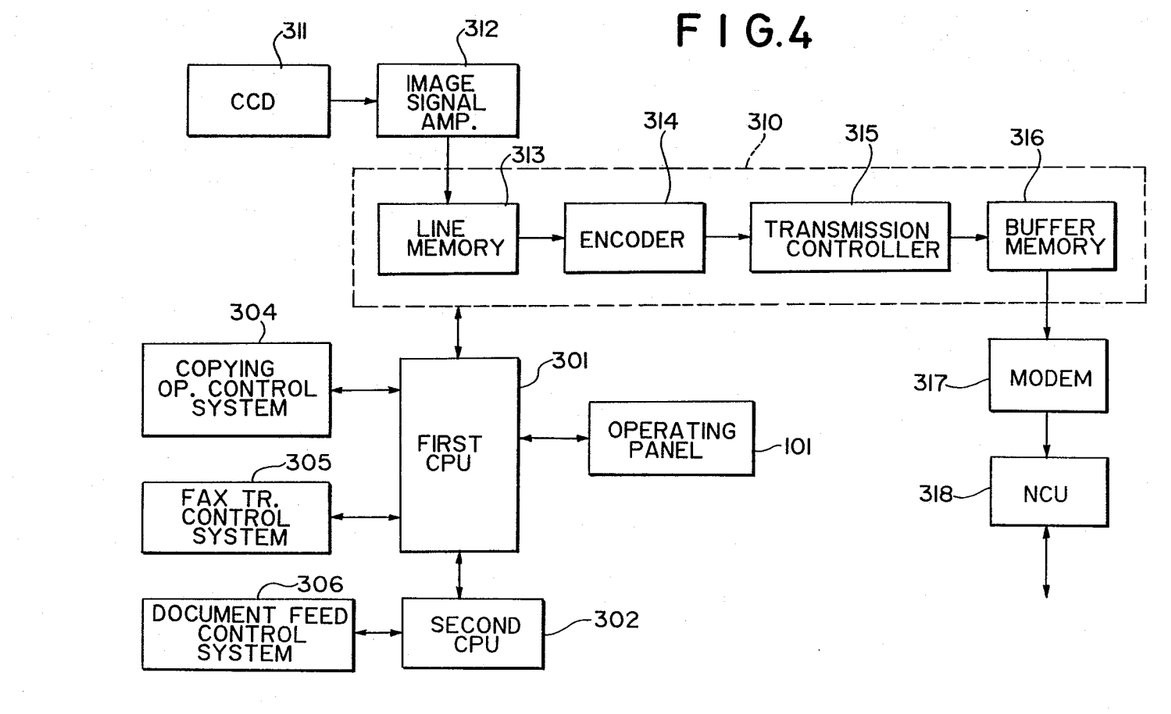
FIG. 4 is a block diagram of a controller incorporated into the integral document processing apparatus of FIG. 1.

Referring to FIG. 4, the document processing apparatus 50 and the ADF 200 thus constructed are controlled by a controller including a first CPU 301 and a second CPU 302, namely, microcomputers. The first CPU 301 mainly controls the document processing apparatus 50 while the second CPU 302 controls tee ADF 200.

The first CPU 301 is connected to the operating panel 101, a copying operation control system 304 including driving circuits for driving a main motor, a developing device driving motor, clutches and chargers, which are not shown, a facsimile transmission control system 305, a facsimile signal encoding circuit 310 and the ADF 200. The second CPU 302 is connected to the first CPU 301 to give signals relating to the operation of the ADF 200 to the first CPU 301.

The basic electrical constitution of the facsimile transmission unit 40 is the same as that of the conventional facsimile transmission equipment. The image read unit 45 reads the image of a document by an array of photodiodes such as CCD 311 to provide an electric image signal representing the mmage of the document. The electric image signal is amplified and binarized by an image signal amplifier 312. A digital image signal thus produced is stored in a line memory 313. The digital image signal is compressed by an encoder 314. A coded image signal is transferred from the encoder through a transmission controller 315 to a buffer memory 316 and is stored in the same. In transmitting the coded image signal, the coded image signal is modulated by a MODEM 317, and then a network control unit (hereinafter abbreviated to "NCU") 318 applies the modulated image signal automatically to a telephone line.

The first CPU 301 controls the facsimile transmission control system 305 and the conveyor rollers 43 and 44 and processes input data.

TThe second CPU 302 controls a document feed control system 306. A position detecting switch SW1 for detecting the position of the DF unit 202, first to fourth document detectors SE1 to SE4 are connected to the input port of the second CPU 302. A driving circuit, not shown, for driving a motor for driving the document feed roller 205, the feed roller 206, the separating roller 207 and the pair of pinch rollers 208 and 209, and a driving circuit, not shown, for driving a solenoid actuator for pressing the document feed roller 205 against a document, and a solenoid actuator for engaging the pair of pinch rollers 208 and 209 are connected to the output port of the second CPU 302.

The first CPU 301 and the second CPU 302 thus associated with the document processing apparatus 50 and the ADF 200 communicate with each other to execute control routines shown in FIGS. 5 (a) to 5 (d) and 6 (a) to 6 (c).

The control procedure of the first CPU 301 will be described with reference to FIGS. 5 (a) to 5 (d).

Figure 5A:
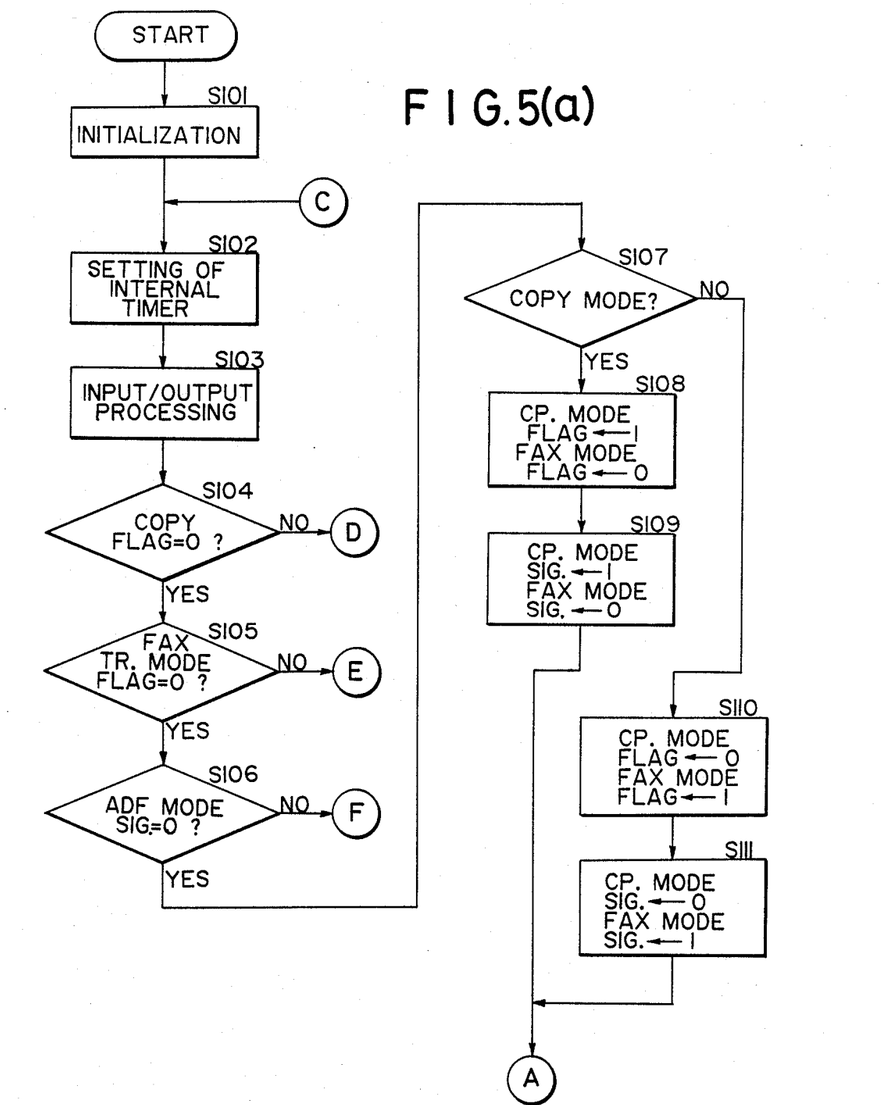

Upon the connection of the document processing apparatus 50 to the power source, initialization is executed in step S101 to set the controlled variables of the document processing apparatus 50 for predetermined values including setting the indication of the number of copies to be produced for "1" and to clear the internal RAMs and internal register of the first CPU. In step S102, an internal timer is set for a fixed time regardless of the douument processing mode to determine the process time in the routine and time count is started.

In step S103, input and output signal are processed.

In step S104, a decision is made whether a copy flag is "0" or not. When the copy flag F is "0", the routine goes to step S105. When the copy flag is "1", the routine jumps to step S125 to execute copying operation. The copy flag becomes "1" upon the start of copying operation and becomes "0" upon the completion of the last scanning cycle for copying operation.

In step S105, a decision is made whether a facsimile transmission mode flag is "0" or not. When the facsimile transmission mode flag is "0", the routine goes to step S106. When the facsimile transmission mode flag is "1", the routine jumps to step S141 to execute facsimile transmission operation. The facsimile transmission mode flag becomes "1" upon the start of the facsimile transmission operation and becomes "0" upon the completion of the transmission of each document.

In step S106, a decision is made whether an ADF mode is specified or not. An ADF mode signal becomes "1" upon the start of the ADF 200 for feeding a document and becomes "0" upon the completion of document discharging operation. The second CPU 302 gives the ADF mode signal to the first CPU 301. The routine goes to step S107 when the ADF mode signal is "0", and jumps to step S151 when the ADF mode iignal is "1".

In step S107, a decision is made whether the copy mode is selected by operating the copy mode selection key 111 or whether the facsimile transmission mode is selected by operating the transmission selection key 112. If the copy mode is selected or has previously been selected, a copy mode flag set for "1" and a facsimile transmission mode flag is set for "0" in step S108. In step S109, a copy mode signal "1" and a facsimile transmission mode signal "0" are given to the second CPU 302.

The copy mode signal and the facsimile transmission mode signal indicates internally and externally whether the document processing apparatus 50 operates in the copy mode or not and whether the document processing apparatus 50 operates in the facsimile transmission mode or not. When the decision in step S107 is "No", namely, whether the facsimile transmission mode is selected or has previously been selected, the copy mode flag is set for "0" and the facsimile transmission mode flag is set for "1" in step S110, and then a copy mode signal "0" and a facsimile transmission mode signal "1" are given to the second CPU 302 in step S111.

Figure 5B:
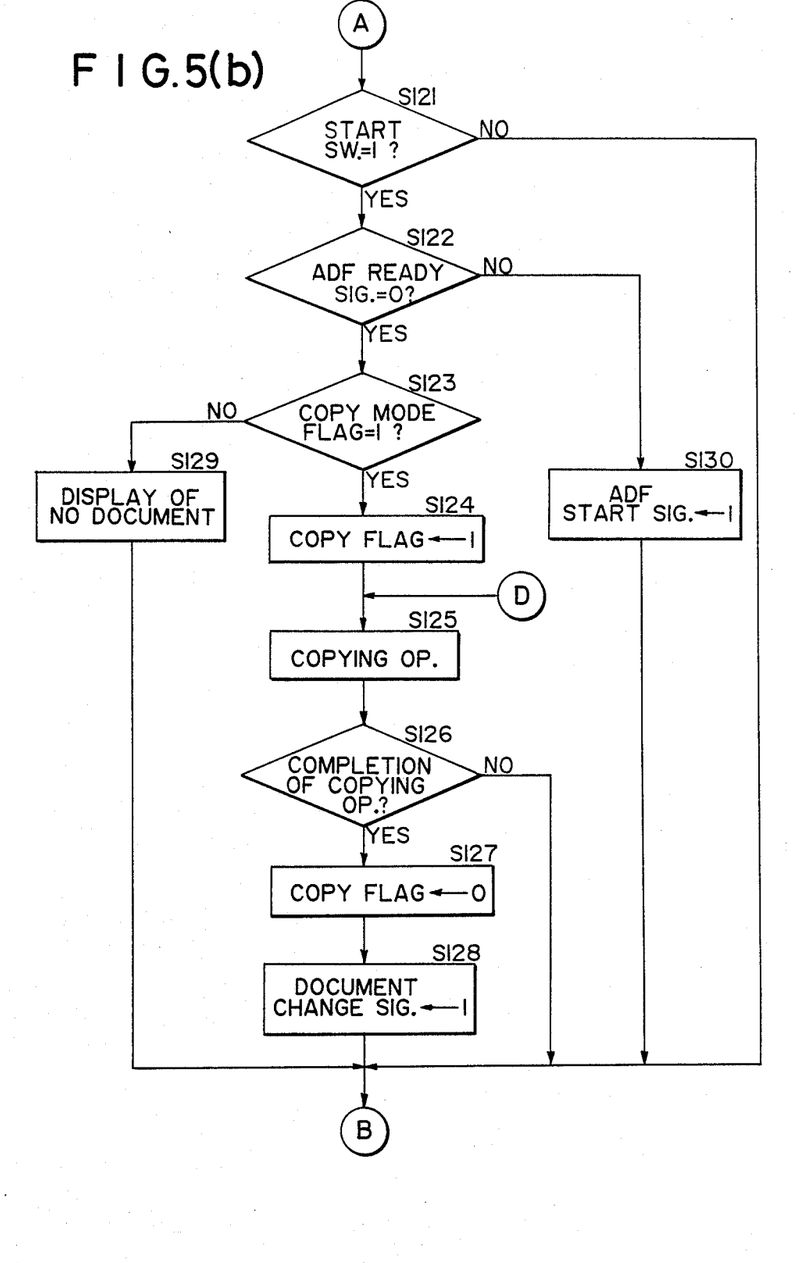

In step S121, a decision is made whether the start key 113 is depressed, namely, whether the start of the copying operation or the facsimile transmission operation is requested or not. When the decision in step S121 is "No", the routine jumps to step S161 and, when "Yes", a decision is made in step S122 whether an ADF ready signal is "0".

When the facsimile transmission mode is selected and the start key 113 is depressed in a state where no document is placed on the document feed tray of the ADF 200, any operation is not started and the absence of any document on the document feed tray is indicated to prevent the failure of facsimile transmission. Accordingly, when a decision is made in step S104, S105 or S106 that the copying operation, the facsimile transmission operation or the automatic document feeding operation is in process, the operation of the start key 113 and the mode selection key 111 is invalidated.

The second CPU 302 gives the ADF ready signal to the first CPU 301. The ADF ready signal is "1" when the ADF 200 is able to feed a document and is "0" when no document is placed on the document feed tray 203 or when the ADF 200 is unable to execute document feeding operation.

When the ADF ready signal is "1", the first CPU 301 gives an ADF start signal "1" to the second CPU 302 in step S130 when the ADF ready signal is "1" to start the ADF 200.

When the ADF ready signal is "0", namely, when documents to be processed are thin sheets or pages of a book which are placed on the contact glass 16 without using the ADF 200, a decision is made in step S123 whether the copy mode flag is "1" or not. When the copy mode flag is "0", namely, when the facsimile transmission mode is selected, since no document is placed in the ADF 200 and the facsimile transmission is impossible, a transmission impossible indication is displayed on the display 102 of the operating panel 101, and then the routine goes to step S161.

When the copy mode flag is "1", the copy flag is set for "1" in step S124 and execute the copying operation in step S125. In step S126, a decision is made whether the copying operation is completed, namely, whether the set number of copies have been producedor not. When the decision in step S126 is "No", the routine goes to step S161 and, when "Yes", the copy flag is set for "0" and the first CPU 301 gives a document change signal "1" to the second CPU 302 in step S128. Then, the ADF 200 executes document changing operation, in which the document placed on the contact glass 16 is discharged and the next document is fed onto the contact glass 16.

In step S161, the first CPU 301 and the second CPU 302 communicate with each other. When the first CPU 301 gives a communication request to the second CPU 302, the second CPU 302 executes an interruption routine to process data. In step S162, a decision is made whether the time counting of the internal timer has completed or not. When the decision in step S162 is "Yes", the routine returns to step S102 to repeat the foregoing steps of the control routine.

Figure 5C:
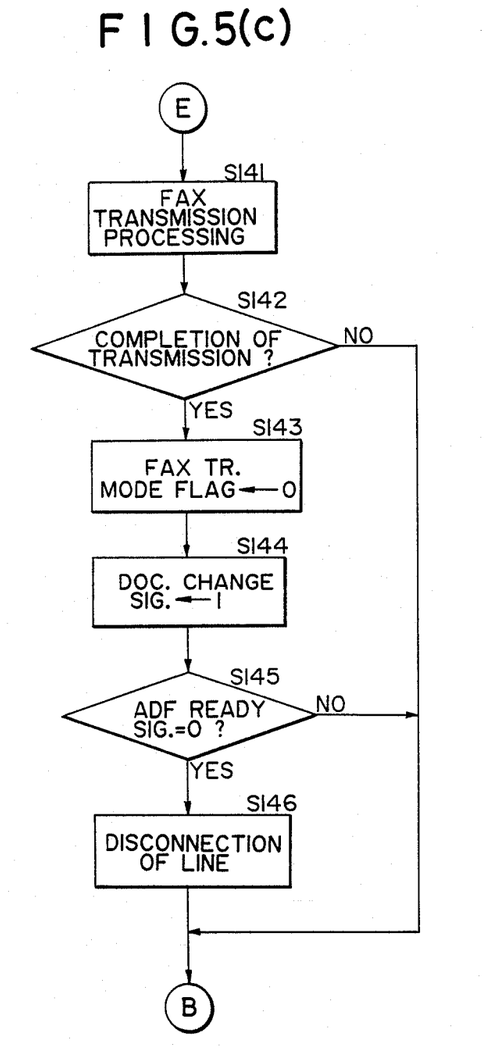

When the decision in step S105 is "No", namely, when the facsimile transmission mode flag is "1", the routine jumps to step S141, where processes relating to facsimile transmission including connection of the transmission line, identification of the type of the receiver, identification of sheet size and conveyance of a document are executed. Then, in step S142, a decision is made whether the transmission of the information on one document has been completed or not. When the decision in step S142 is "No", the routine jumps to step S161 and, when "Yes", the facsimile transmission mode flag is set for "0" in step S143 and the document change signal "1" is provided in step S144. Then, in step S145, a decision is made whether the ADF ready signal is "0", namely, whether there is any document to be transmitted or not. When the ADF ready signal is "0", the line is disconnected in step S146 and, when "1", the routine jumps to step S161.

Figure 5D:
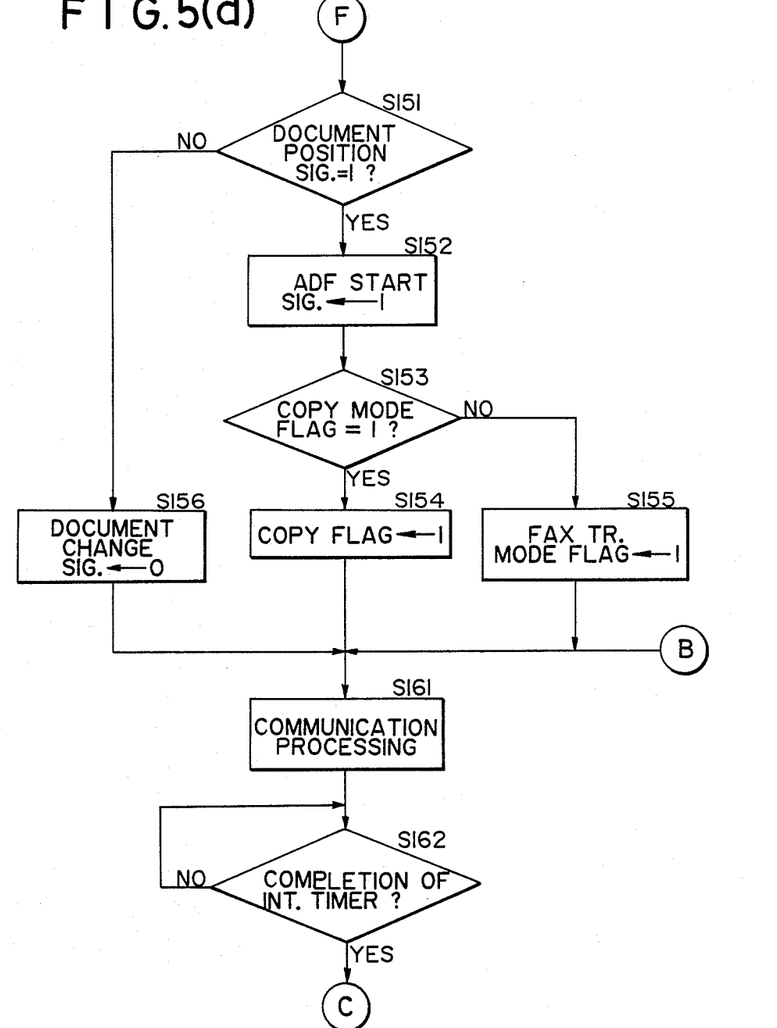

When the decision in step S106 is "No", namely, when the ADF mode signal is "1", the routine jumps to step S151, where a decision is made whether a document position signal given by the second CPU 302 to the first CPU 301 is "1" or not. The document position signal is "1" when a document is set on the contact glass 16 or at the entrance of the facsimile transmission unit 40 by the ADF 200 and is "0" when no document is set on the contact glass or at the entrance of the facsimile transmission unit 40 or when the ADF 200 is in document setting operation. When the document position signal is "0", the document change signal which has been set for "1" in step S128 is set for "0" in step S156, and then the routine goes to step S161. When the document position signal is "1", the ADF start signal which has been set for "1" in step S130 is reset to "0" in step S152, and then the routine goes to step S153.

In step S153, a decision is made whether the copy mode flag is "1" or not. When the copy mode flag is "1", the copy flag is set for "1" in step S154 and, when "0", namely, when the facsimile transmission mode is selected, the facsimile transmission flag is set for "1" in step S155, and then operation in the copy mode or in the facsimile transmission mode depending on the decision in step S153 is started. Then, the routine goes to step S161.

Figure 6A:
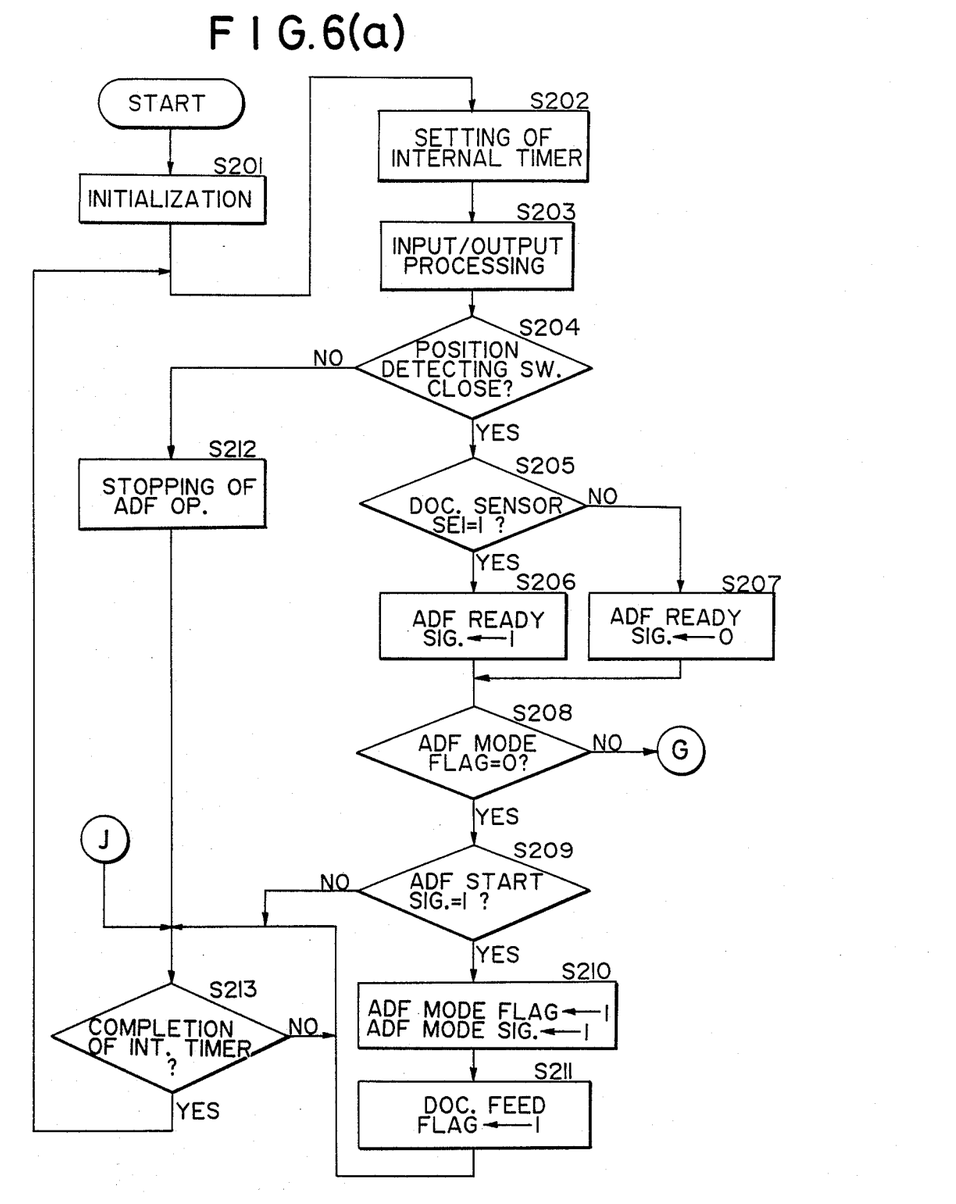
Figure 6B:
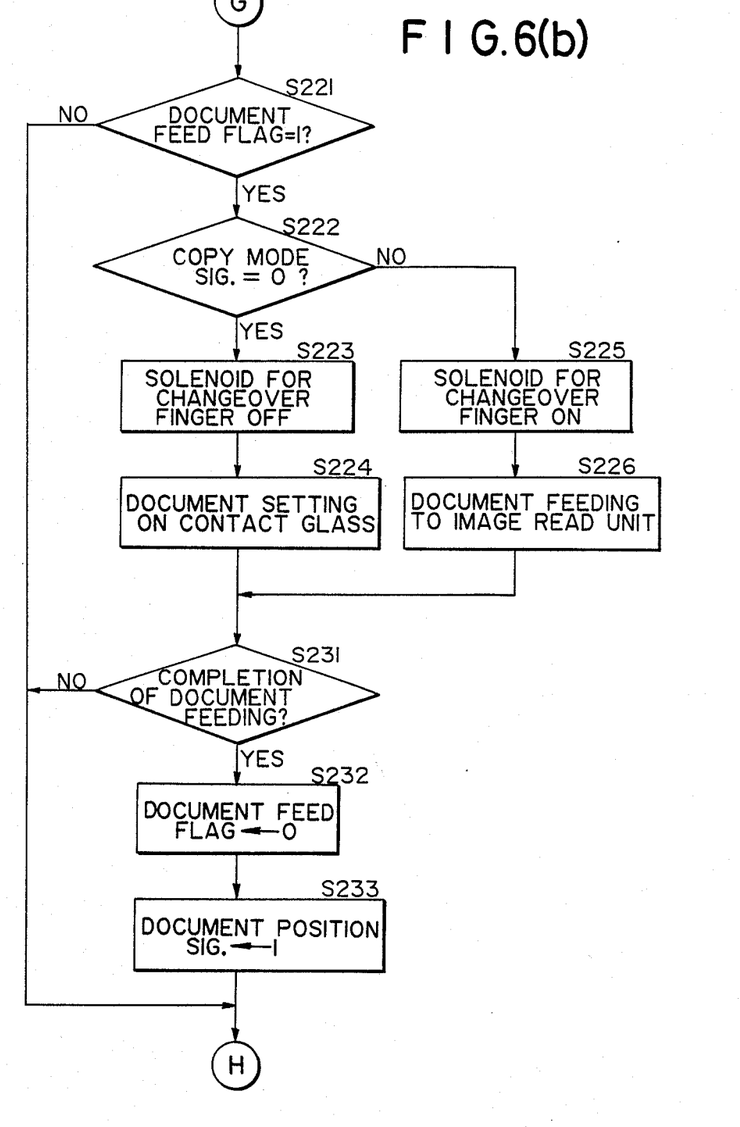
Figure 6C:
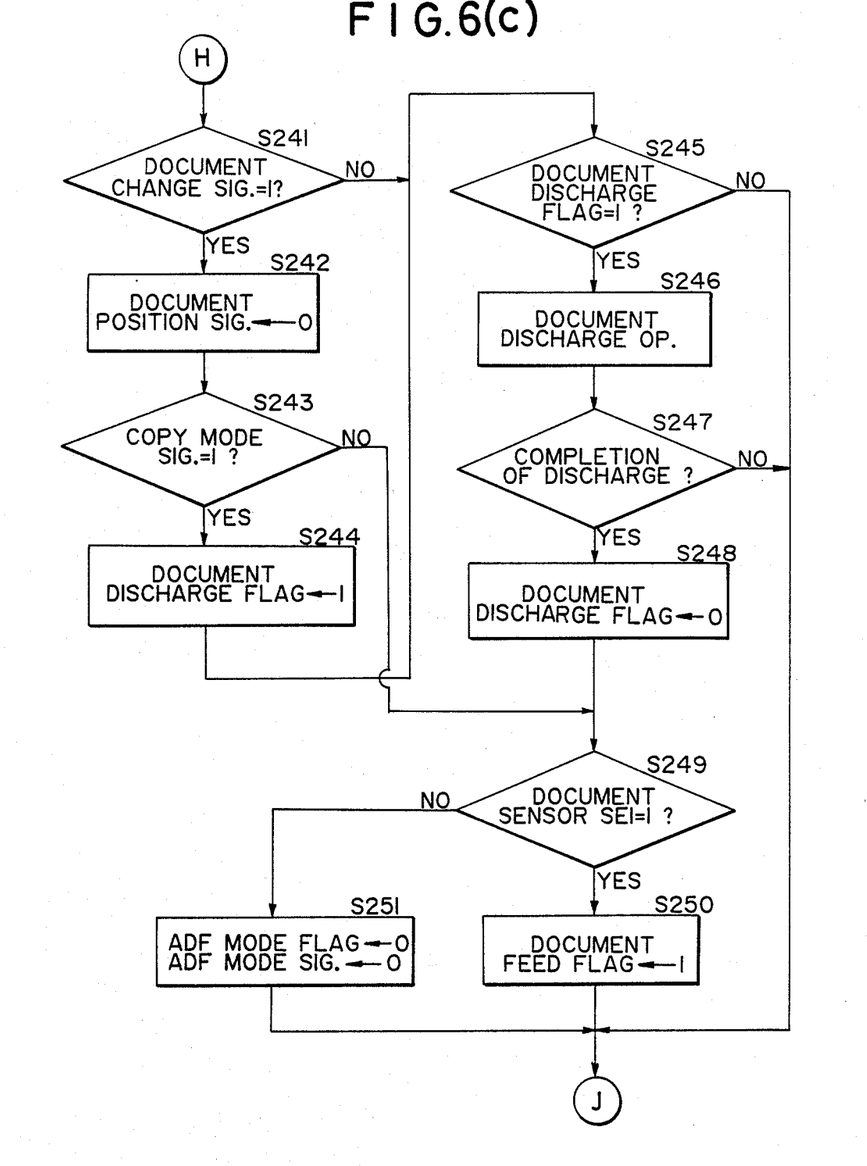
Figure 7:
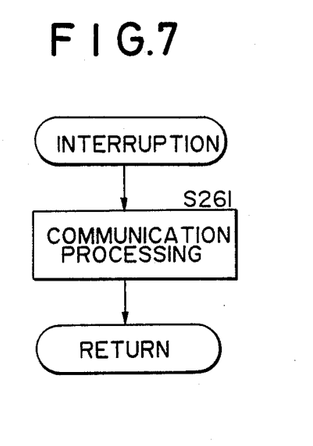
FIG. 7 is a flow chart showing the interrupt communication routine.
Figure 8:
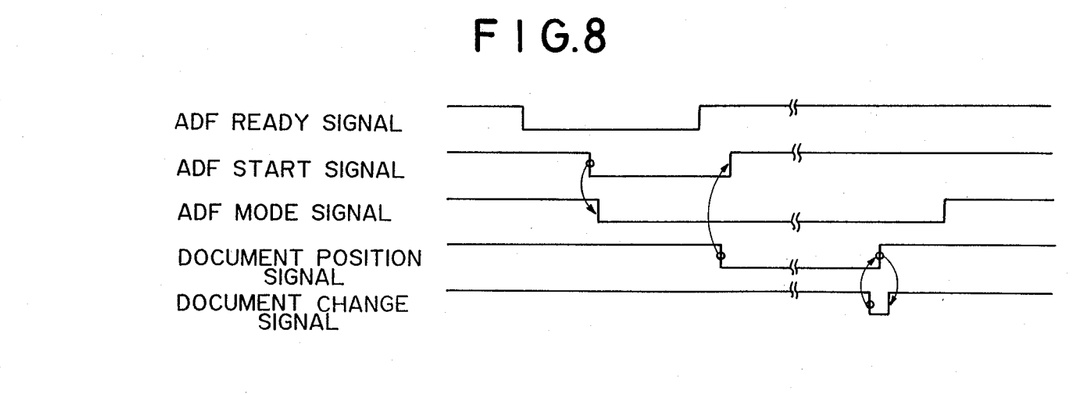
FIG. 8 is a timing chart of control signals for controlling document feeding operation.

FIGS. 6 (a) to 6 (c) are flow charts showing steps of control routines to be executed by the second CPU 302 for controlling the ADF 200, FIG. 7 is a flow chart of an interruption routine for communication between the first CPU 301 and the second CPU 302, and FIG. 8 is a time chart of signals for controlling the operation of the ADF 200.

Referring to FIGS. 6 (a) to 6 (c), processes in steps S201, S202 and S203 are initialization, setting of internal timer and input/output processing, respectively, and they are corresponded to processes in steps S101, 102 and 103 of FIG. 5 (a).

In step S204, a decision is made whether the position detecting switch SW1 is closed or not. When the position detecting switch SW1 is open, indication that the ADF 200 is not mounted in place is executed and operation for driving the ADF 200 is stopped in step S212, and then the routine jumps to step S213. That is, the ADF 200 is not driven until the DF unit 202 is placed in the operating position.

In step S205, a decision is made on the basis of the output of the first document detector SE1 whether any document or documents are placed on the document feed tray 203 or not. When the decision in step S205 is "Yes", the ADF ready signal is set for "1" in step S206 and, when "No", the ADF ready signal is set for "0" in step S207, and then the routine goes to step S208. In step S208, a decision is made whether the ADF mode flag is "0" or not. Then, the routine goes to step S209 when the ADF mode flag is "0" or goes to step S221 when the ADF mode flag is "1". The ADF mode flag, similarly to the ADF mode signal, is "0" or "1". During the copying operation or the facsimile transmission operation in the ADF mode, the ADF start signal is invalidated.

In step S209, a decision is made whether the ADF start signal provided by the first CPU 301 is "1" or not. The routine jumps to step S213 when the ADF start signal is "0". When the ADF start signal is "1", the ADF mode flag and the ADF mode signal are set for "1" in step S210, and a document feed flag is set for "1" in step S211. After these steps for starting the ADF 200 have been accomplished, the routine goes to step S213.

When the decision in step S208 is "No", namely, when the ADF mode flag is "1", a decision is made in step S221 whether th document feed flag is "1", namely, whether the document setting operation is to be executed or not. When the ADF mode flag is "0", the routine jumps to step S241 without executing document feed operation. When the document feed flag is "1", a decision is made in step S222 whether the copy mode signal provided by the first CPU 301 is "1", namely, whether the document processing apparatus 50 is to be operated in the copy mode or whether the document processing apparatus is to be operated in the facsimile transmission mode. When the copy mode is selected, a solenoid for driving the document feed passage changeover finger 213 is de-energized in step S223, and then document feed operation for setting a document on the contact glass 16 is carried out in step S224.

When the facsimile transmission mode is selected, the solenoid for driving the document feed passage changeover finger 213 is energized in step S225, and then document feed operation for feeding a document at the entrance of the image read unit 45 is carried out in step S226.

A decision is made in step S231 whether the document feed operation has been completed or not. When the decision in step S231 is "No", the routine jumps to step S241 and, when "Yes", the routine goes to step S232 to reset the document feed flag to "0". Then, in step S233, the document position signal is set for "1" and is given to the first CPU 301.

In step S241, a decision is made whether the document change signal provided by the first CPU 301 is "1" or not. The routine goes to step S245 when the document change signal is "0" or step S242 and the following steps are executed when the document change signal is "1".

Steps S242 to S251 are executed in response to the document change request of the first CPU 301.

When the decision in step S243 is "Yes", namely, when the copy mode is selected, steps S244 to S248 are executed to discharge the document to be discharged, and then a decision is made in step S249 whether the next document exists on the document feed tray 203 or not. Document feed operation is requested in step S250 when the decision in step S249 is "Yes" or the operation of the ADF 200 is stopped in step S251 when the decision in step S249 is "No".

When the decision in step S243 is "No", namely, when the facsimile transmission mode is selected, steps S249 and S251 are executed.

A decision is made in step S213 whether the time defining the cycle time of the routine for which the main timer was set in step S202 has elapsed or not. The routine returns to step S202 when the decision in step S213 is "Yes" or step S213 is repeated when the decision in step S213 is "No" until the time elapses.

When an interruption request is provided by the first CPU 301, communications procedure is carried out in step S261 as shown in FIG. 7.

As apparent from what has been described hereinbefore, the integral document processing apparatus in accordance with the present invention has a single document feed unit capable of being used for feeding documents for both copying operation and facsimile transmission operation. When facsimile transmission/reception equipment is connected to a PBX, the receiving function of the facsimile transmission/reception equipment becomes entirely invalid. However, since the integral document processing apparatus of the present invention has only a transmission function, no function becomes invalid even if the integral document processing apparatus is connected to a PBX.

Furthermore, since the integral document processing apparatus comprises a copying machine and a facsimile transmission equipment in an integral unit, the integral document processing apparatus requires less space for installation as compared with an individual copying machine and an individual facsimile transmission equipment.

Still further, since the integral document processing apparatus of the present invention comprises an ordinary analog electrophotographic copying unit and a facsimile transmission unit and does not comprise any receiving unit including memories and a laser optical system, the integral document processing apparatus of the present invention can be manufactured at a less cost than that of an integral document processing apparatus comprising, in combination, a digital copying machine and a facsimile equipment.

Although the invention has been described in its preferred form with a certain degree of particularity, it is to be understood to those skilled in the art that many changes and variations are possible in the invention without departing from the scope and spirit thereof.

What is claimed is:

1. An integral document processing apparatus comprising an image forming system and a facsimile transmission system, further comprising:
   a document storing means for storing a plurality of documents;
   a first document read unit;
   a second document read unit;
   a document feed means capable of feeding the documents stored in the document storing means one at a time;
   a first document conveying means for conveying the document fed by the document feed means to the first document read unit;
   a second document conveying means for conveying the document fed by the document feed means to the second document read unit;
   a document passage changeover means for selectively guiding the document to the first document conveying means or to the second document conveying means;
   an image forming means capable of reading the document delivered to the first document read unit and forming the image of the document on a copying sheet; and
   a facsimile transmission means capable of reading the document delivered to the second document read unit and providing an electric signal representing the image of the document.

2. An integral document processing apparatus comprising an image forming system and a facsimile transmission system, according to claim 1, wherein said image forming means is an electrophotographic copying machine having means for forming latent image of a document on a photosensitive means by scanning the document by an optical scanning system.

3. An integral document processing apparatus comprising an image forming system and a facsimile transmission system, according to claim 1, wherein said facsimile transmission means is a facsimile transmission equipment having means for providing an electric image signal representing the image of a document by scanning the document by an array of photosensitive conversion elements.

4. An integral document processing apparatus comprising an image forming system and a facsimile transmission system, further comprising:
   a document storing means for storing a polurality of documents;
   a first exposure unit;
   a second exposure unit;
   a first feed means for feeding a document from the document storing means to the first exposure unit;
   a second feed means for feeding a document from the document storing means to th second exposure unit;
   a feed means selecting means for selecting either the first feed means or the second feed means;
   an image forming means capable of reading a document delivered to the first exposure unit and forming the image of the document on a copying sheet; add
   a transmission means capable of reading a document delivered to the second exposure unit, converting the image of the document into a corresponding electric image signal, and transmitting the electric image signal.

5. An integral document processing apparatus comprising an image forming system and a facsimile transmission system, according to claim 4, wherein said image forming means is an electrophotographic copying machine having means for forming the latent image of a document on a photosensitive means by scanning the document by an optical scanning system.

6. An integral document processing apparatus comprising an image forming system and a facsimile transmission system, according to claim 4, wherein said facsimile transmission means is a facsimile transmission equipment having means for transmitting an electric image signal representing the image of a document by scanning the document by an array of photoelectric conversion elements.

7. An integral document processing apparatus comprising a copying system and a facsimile transmission system, further comprising:

a document storing means for storing a plurality of documents;

a document feed means capable of feeding the documents stored in the document storing means one at a time;

a first exposure unit;

a second exposure unit;

a first conveying means for conveying a document fed by the document feed means to the first exposure unit;

a second conveying means for conveying a document fed by the document feed means to the second exposure unit;

a document feed passage changeover means for selectively guiding a document fed by the document feed means to the first conveying means or to the second conveying means;

an electrophotographic copying means for copying the image of a document delivered to the first exposure unit; and a facsimile transmission means for converting the image of a document delivered to the second exposure unit into a corresponding electric image signal and transmitting through a communication line.

* * * * *